United States Patent [19]

Morishita

[11] 3,979,082
[45] Sept. 7, 1976

[54] FISHING SPINNING-REEL SPOOL MOUNTING AND DEMOUNTING DEVICE

[75] Inventor: Yasomatsu Morishita, Kure, Japan

[73] Assignee: Ryobi, Ltd., Hiroshima, Japan

[22] Filed: Apr. 2, 1975

[21] Appl. No.: 564,223

[52] U.S. Cl. .......................................... 242/84.2 R
[51] Int. Cl.² ........................................ A01K 89/00
[58] Field of Search ................. 242/84.2 R, 84.2 A, 242/84.2 G, 84.21, 84.21 A

[56] References Cited
UNITED STATES PATENTS

| | | | |
|---|---|---|---|
| 2,604,273 | 7/1952 | Hayes | 242/84.2 R |
| 3,693,901 | 9/1972 | Lilland | 242/84.2 R |

FOREIGN PATENTS OR APPLICATIONS

| | | | |
|---|---|---|---|
| 784,183 | 10/1957 | United Kingdom | 242/84.2 R |
| 1,257,751 | 12/1971 | United Kingdom | 242/84.2 R |

Primary Examiner—Edward J. McCarthy

[57] ABSTRACT

A device for mounting and demounting a spool in a fishing spinning-reel having slits provided on a reel shaft and a plate spring, a push button and a cover provided respectively on a spool. The plate spring has two elastic holding pieces which is fitly pressed in the slits. Each holding pieces includes a slant outside plate portion with which the rear edge of the push button is in contact. When the push button is pushed down, the push button spread the outside plate portions at the rear edge thereof to make the holding pieces free from the reel shaft whereby the spool can easily and speedily be exchanged by one touch operation.

4 Claims, 4 Drawing Figures

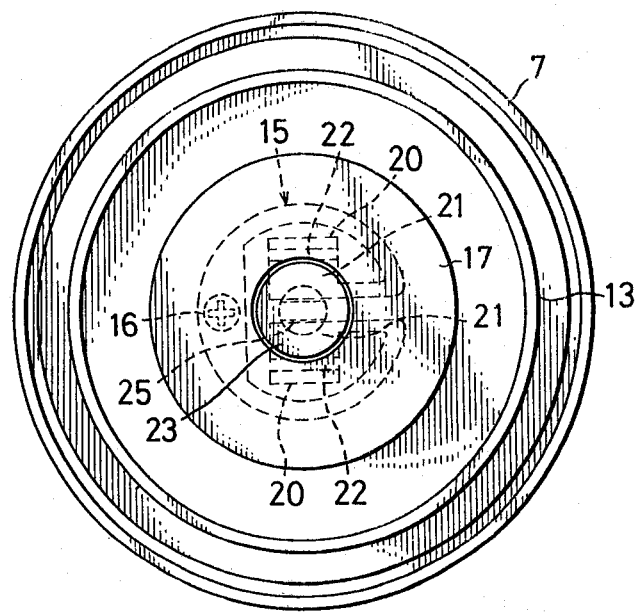
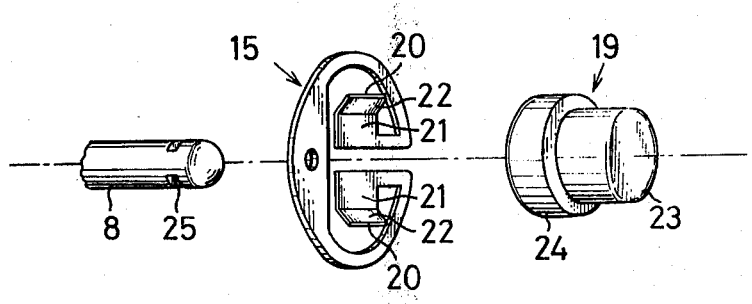

FISHING SPINNING-REEL SPOOL MOUNTING AND DEMOUNTING DEVICE

BACKGROUND OF THE INVENTION

This invention relates to a device for mounting and demounting a spool in a spinning-reel for fishing.

The conventional spinning type reels, generally, were provided with a drag mechanism for preventing a break of a line when a excess tension is loaded on the line, and a finger grip for adjusting such drag mechanism was provided at an outer end of a reel shaft in the front of a spool. Therefore, when a fisherman wants to exchange the spool with the one which suits the size and length of the line selected to meet the size of a fish to be caught, he must remove the drag mechanism adjusting grip for each such exchange of spool. For detaching this adjusting grip from the end of the reel shaft, it was necessary to turn the grip many times, and once detached, it was perfectly separated from the spool, so that there was likelihood of inadvertently dropping and losing the grip during such spool exchanging operation. Thus, presence of this adjusting finger grip was a hindrance to spool exchange. Also, the drag mechanism itself was seldom utilized as it could not be operated when hauling in the fish caught.

SUMMARY OF THE INVENTION

It is therefore the primary object of the present invention is to provide a spool mounting and demounting device which can eliminate the drag mechanism as well as its adjusting finger grip from the fishing spinning-reel so as to allow easy and speedy spool exchange.

Another object of the present invention is to provide a spool mounting and demounting device of the type described, which is mainly composed of a plate spring having two elastic holding pieces retained with a given space therebetween, and a push button adapted for spreading the space between the two holding pieces.

Still another object of the present invention is to provide a spool mounting and demounting device which makes it possible to remove the spool by merely pushing the button of which the head portion projects out from a central hole of a cover plate mounted in a recess formed in the front of the spool.

Yet another object of the present invention is to provide a device whereby the fixing of the spool in the reel can be accomplished by merely press fitting the hollow portion of the spool with the reel shaft while pushing the push button.

It is a further object of the present invention to provide a spinning reel for fishing which is simple in construction, low in manufacturing cost and highly durable.

Other objects and advantages of the present invention will become apparent from the following detailed description of the invention as taken in conjunction with the accompanying drawings.

BRIEF DESCRIPTION OF THE DRAWINGS

In the drawings:

FIG. 3 is a front view of the device of FIG. 1, with a plate spring and its fixing screw being shown in broken lines; and FIG. 4 is an exploded perspective view showing the reel shaft, plate spring and push button.

DESCRIPTION OF THE PREFERRED EMBODIMENT

Figure 1:
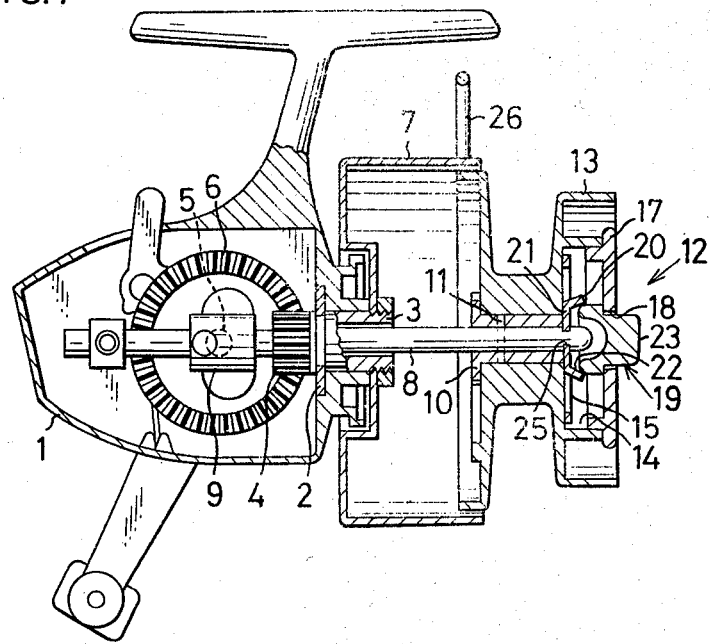
FIG. 1 is a sectional view of a spinning-reel for fishing provided with a spool mounting and demounting device according to the present invention.

Referring to an embodiment of the present invention shown in the drawings, a casing 1 receives a reel shaft 8 which extends longitudinally from rear to front and outwardly thereof through the front wall of the casing 1 to support a spool 13. At the front wall of the casing 1, the reel shaft 8 run through a sleeve 3 which is rotatably mounted in the wall through a bearing 2. The sleeve 3 has a pinion 4 integrally formed therewith at the rear end, which mesh with a drive gear 6 supported by a handle shaft 5. The front end of the sleeve 3 is threadedly provided with a flyer 7 on which a bail arm 26 is carried. The shaft 8 is connected to a reel shaft reciprocating mechanism 9 at the rear portion, thereby to be able to be reciprocated axially. An annular spool seat 10, on which the spool 13 is received, is supported on the front end portion of the reel shaft 8 and secured there by a pin 11. The reel shaft 8 is provided with slits 25 formed in diametrically opposition to each other and transversely to the shaft near the frontmost end thereof.

Figure 2:
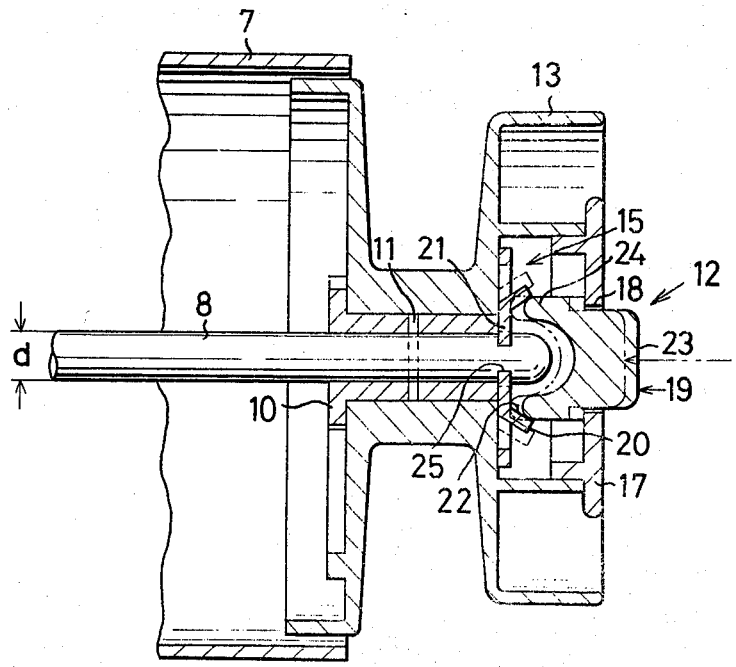
FIG. 2 is a partially enlarged sectional view of the device of the invention shown in FIG. 1.

As is clearly shown in FIGS. 2 and 3, in the inside of the spool, a plate spring 15 is secured by a screw 16 to the bottom of a recess 14 formed in the front of the spool. The plate spring 15 is in contact with the rear edge 24 of a push button 19 at outside plate portions 20 of a pair of elastic holding pieces 21 thereof which are respectively pressed fitly in the slits 25 thereby to prevent accidental displacement or removal of the spool 13. The holding pieces 21 are usually retained with a certain space therebetween and the pieces 21 are integrally formed with the outside plate portions 20 each having a slant face 22 formed by bending the plate 20 upwardly, with which the rear edge 24 of the button 19 is in contact as described above. A head 23 of the push button 19 projects out of a central hole 18 of a cover or holder plate 17 which is threaded in the opening of the recess 14.

An operation of the present device is described hereinafter. When the push button 19 is pushed down, its rear end portion 24 advances while sliding down the slant face 22 to spread out the outside plate portions 20 of the holding pieces 21, so that the distance between the two holding pieces 21 is expanded out. When the distance becomes greater than the diameter $d$ of the reel shaft 8, the holding pieces 21 are freed from the shaft, so that the spool 13 can be permitted to be pulled out. The similar operations are performed when mounting the spool in position. In this case, since the spool seat 10 is fixedly provided at the certain position convenient for retaining the spool on the reel shaft 8, there is no need of making sure of the inserted position. Therefore, the demounting of the spool 13 is completed only by pushing down the button 19 until the holding pieces 21 are freed from the reel shaft 8 and then pulling out the spool. Likewise, the mounting of the spool 13 is accomplished merely by inserting the spool 13 onto the reel shaft untill it hits against the seat 10 and then releasing the push button 19.

What is claimed is:

1. A device for mounting and demounting a fishing spinning-reel spool on a reel shaft having slits provided near the front end thereof, said device comprising:
   a plate spring having a pair of elastic holding arms sized and spaced to fit into said slits in the unstressed state of said arms;
   a push button having a rear edge in contact with said holding arms; and
   a cover mounted on the front of the spool and having a central hole therein for projection of the front edge of said push button therethrough;
   said holding arms each comprising outside plate portions bent away from the plane of said plate spring toward said rear edge of said push button to thereby form a pair of slanted cam faces against which said rear edges of said push button can be pushed to spread said arms apart and release said arms from confinement in said slits.

2. A spool mounting and demounting device as set forth in claim 1, wherein said slits are formed in diametrical opposition to each other and transversely to said reel shaft.

3. A spool mounting and demounting device as set forth in claim 1, wherein said plate spring is received in a recess provided in the front of the spool.

4. A spool mounting and demounting device as set forth in claim 1, including a spool seat for receiving said spool, said spool seat supported on the front end portion of said reel shaft.

* * * * *